United States Patent [19]
Gunter et al.

[11] 3,723,480
[45] Mar. 27, 1973

[54] ANTRAQUINONE DYESTUFFS

[75] Inventors: Gehrke Gunter; Volker Hederich, both of Cologne; Wolfgang Harms, Leverkusen; Peter Wegner, Cologne, all of Germany

[73] Assignee: Bayer Aktiengesellschaft

[22] Filed: July 8, 1970

[21] Appl. No.: 53,282

[30] Foreign Application Priority Data

July 17, 1969 Germany.....................P 19 36 400.2

[52] U.S. Cl..........................260/373, 8/39, 260/37 N
[51] Int. Cl................................C09b 1/52
[58] Field of Search...........................260/373

[56] References Cited

UNITED STATES PATENTS 2,992,240  7/1961  Lodge ....................260/373
2,014,810  9/1935  Lodge et al..............260/373

FOREIGN PATENTS OR APPLICATIONS 1,271,284  6/1968  Germany................260/373

OTHER PUBLICATIONS

Libs, The Chemistry of Synthetic Dyes and Pigments, pp. 293, 294, (1955).

Primary Examiner—Henry R. Jiles
Assistant Examiner—E. Jane Skelly
Attorney—Plumley & Tyner

[57] ABSTRACT

Anthraquinone dyestuffs of the formula

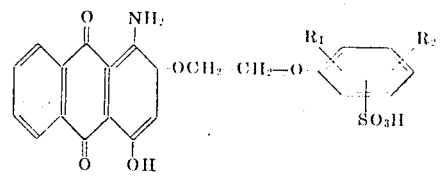

in which $R_1$ and $R_2$, independently of one another, stand for hydrogen, straight-chain or branched alkyl radicals with one to nine carbon atoms or chlorine atoms.

The new compounds are valuable dyestuffs for the dyeing of fibers of natural or synthetic polyamides. The brilliant red dyeings or prints exhibit excellent fastness to wet processing, very good fastness to light and outstanding fastness to thermofixing.

7 Claims, No Drawings

ANTRAQUINONE DYESTUFFS

The subject-matter of the invention comprises new anthraquinone dyestuffs of the formula

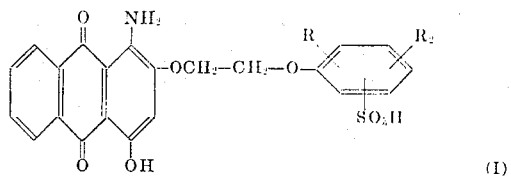

(I)

a process for their production as well as their use for the dyeing of nitrogen-containing fiber materials.

In the general formula (I) the symbols $R_1$ and $R_2$, independently of one another, denote hydrogen, straight-chain or branched alkyl radicals with one to nine carbon atoms, or chlorine atoms. Suitable $C_1$— $C_9$-alkyl radicals are, for example, methyl, ethyl, propyl, isopropyl, butyl, isobutyl, tert.-butyl, pentyl, isopentyl, 2-methylbutyl, hexyl, 1,1-dimethylbutyl, 1-methyl-1-ethyl-propyl, cyclohexyl, heptyl, 1,1,3-trimethylbutyl, 4-methyl-cyclohexyl, octyl, 1,1-dimethylhexyl, 1,1,3,3-tetramethylbutyl, nonyl.

The new compounds are obtained by monosulphonation of the corresponding 1-amino-2-phenoxy-ethoxy-4-hydroxy-anthraquinones which, in turn, can be prepared by reacting 1-amino-4-hydroxy-anthraquinones which contain an exchangeable substituent in the 2-position, e.g., an optionally substituted phenoxy group, a lower alkoxy group, a sulphonic acid group, a bromine or chlorine atom, with the corresponding phenoxy-ethanol.

Sulphonation of the 1-amino-2-phenoxy-ethoxy-4-hydroxy-anthraquinones to form the dyestuffs according to the invention is carried out in dilute or fuming sulphuric acid at −20° to +50° C, the conditions being chosen in accordance with the substituents $R_1$ and $R_2$ in such a manner that only one sulphonic acid group is introduced into the phenoxy radical. In general, the procedure consists in dissolving the 1-amino-2-phenoxy-ethoxy-4-hydroxy-anthraquinones in 5 to 50 parts of sulphuric acid the concentration of which preferably amounts to between 80 percent sulphuric acid and 20 percent oleum. The optimum concentration and temperature can easily be ascertained by preliminary experiments. The solution is stirred until monosulphonation has occurred; this can be established by chromatography of a worked-up sample. The solution is then poured into water, salted out, if necessary, and the dyestuff is isolated by filtration.

The new compounds are valuable dyestuffs for the dyeing of fibers of natural of synthetic polyamides, such as wool, silk, polyamide 6, polyamide 66, polyamide 610, polyamide 11. Brilliant red dyeings or prints of excellent fastness to wet processing, very good fastness to light and outstanding fastness to thermofixing are obtained on these fibers by the usual methods.

Admittedly, the unsulphonated 1-amino-2-phenoxy-ethoxy-4-hydroxy-anthraquinones are also suitable for the dyeing of synthetic polyamides but they have a substantially poorer fastness to wet processing and thermofixing than the dyestuffs according to the invention.

The parts in the Examples are parts by weight and the percentages are per cent by weight, unless otherwise stated; the temperatures are given in degrees Centigrade.

EXAMPLE 1

100 Parts 1-amino-2-(p-tert.-butyl-phenoxyethoxy)-4-hydroxy-anthraquinone are dissolved at 0° in 600 parts of 96 percent sulphuric acid. The mixture is stirred at 0° for about 1 hour until a worked-up sample shows than monosulphonation has occurred. The solution is then poured into 2000 parts of ice-water, the precipitate is filtered off with suction, the dyestuff is neutralized with a sodium carbonate solution and dried.

100 Parts of fiber material of polyamide 6 are dyed in a dyebath consisting of 4000 parts of water, 10 part acetic acid (60 percent by volume) and 1 part of the dyestuff obtained. The bath is heated to boiling temperature within 30 minutes and dyeing is performed at the boil for a further 60 minutes. The material is then rinsed with cold water, dried, and a brilliant red dyeing of very good fastness to wet processing and thermofixing and outstanding fastness of light is obtained.

Similar dyeings are obtained on other synthetic and natural polyamides, such as polyamide 66, polyamide 610, polyamide 11, wool or silk.

EXAMPLE 2

10 Parts 1-amino-2-phenoxy-ethoxy-4-hydroxy-anthraquinone are dissolved at 0° in 100 parts of 90 percent sulphuric acid. The mixture is stirred at 0° for about 2 hours until a sample shows that monosulphonation has occurred. The mixture is then worked up as described in Example 1.

30 Parts of the dyestuff so obtained are dissolved in hot water. 80 Parts thiodiethylene glycol and 50 parts urea are added and the solution is stirred into 500 parts of a crystal gum thickening agent. A solution of 15 parts ammonium sulphate in water is then added and the solution is made up to 1000 parts with water. A fabric of polyamide 66 is printed with this printing mixture according to the roller or screen printing process, dried and fixed in a star steamer at 110° for 30 minutes. After the usual finishing by soaping and rinsing, a clear red print of excellent fastness to light and very good fastness to wet processing and thermofixing is obtained.

Similar prints are obtained on other synthetic or natural polyamides, such as polyamide 6, polyamide 610, polyamide 11, wool or silk.

EXAMPLE 3

10 Parts 1-amino-2-(p-chlorophenoxy-ethoxy)-4-hydroxy-anthraquinone are dissolved at 20° in 80 parts of 5 percent oleum and the mixture is stirred until a sample has become complete water-soluble. The mixture is then worked up as described in Example 1.

A dyebath is prepared from 1 part of the dyestuff obtained, 10 parts sodium sulphate, 2 parts acetic acid (60 percent by volume) and 4000 parts of water. 100 Parts of wool are introduced into this dyebath at 40°, the bath is heated to 100° within 30 minutes and dyeing is carried out at 100° for 60 minutes. After rinsing and drying, there is obtained a clear somewhat bluish red dyeing of very good fastness to wet processing and excellent fastness to light.

Similar dyestuffs are obtained when the p-chloro derivative is replaced with the o- or m-chlorophenoxy compound or the p-chloro-m-methyl-phenoxy derivative.

Similar dyeings are obtained on other polyamides.

EXAMPLE 4

10 Parts 1-amino-2-(m-cresoxy-ethoxy)-4-hydroxy-anthraquinone are dissolved at 0° in 100 parts of 90 percent sulphuric acid. When a sample shows that the monosulphonic acid has been formed, the mixture is worked up as described in Example 1. The dyestuff obtained yields on synthetic or natural polyamides according to Examples 1 – 3 clear red dyeings or prints of very good fastness properties.

Similar dyestuffs are obtained when the n-cresoxy derivative is replaced with the o- or p-cresoxy compound or with mixtures of technical cresols.

EXAMPLE 5

10 Parts 1-amino-2-(o-isopropylphenoxy-ethoxy)-4-hydroxy-anthraquinone are dissolved at 0° in 100 parts of 90 percent sulphuric acid. When a sample shows that the monosulphonic acid has been formed, the mixture is worked up as described in Example 1; a dyestuff is obtained which according to the instructions of Examples 1 – 3 yields on polyamides clear red dyeings or prints of very good fastness properties.

Similar dyestuffs are obtained when the p-isopropyl compound is used, instead of the o-isopropyl compound.

EXAMPLE 6

10 Parts 1-amino-2-[p-(1',1',3',3'-tetramethyl-butyl)-phenoxy-ethoxy]-4-hydroxy-anthraquinone are sulphonated as described in Example 2. The dyestuff obtained yields according to the instructions of Examples 1 – 3 on polyamides clear red dyeings or prints of very good fastness properties.

Similar dyeings are obtained when the dyestuffs of the formula (I) mentioned in the Table are used, $R_1$ and $R_2$ denoting the stated substituents.

| Example | $R_1$ | $R_2$ |
|---|---|---|
| 7 | 2-$C_2H_5$ | H |
| 8 | 2-$C_2H_5$ | 4Cl |
| 9 | 3-$C_2H_5$ | H |
| 10 | 4-$C_2H_5$ | H |
| 11 | 2-$CH_3$ | 3-$CH_3$ |
| 12 | 3-$CH_3$ | 4-$CH_3$ |
| 13 | 2-$CH_3$ | 4-$CH_3$ |
| 14 | 3-$CH_3$ | 5-$CH_3$ |
| 15 | 2-$CH_3$ | 3-Cl |
| 16 | 2-$CH_3$ | 4-Cl |
| 17 | 3-$CH_3$ | 2-Cl |
| 18 | 4-$CH_3$ | 2-Cl |
| 19 | 2-$C_2H_5$ | 3-$CH_3$ |
| 20 | 3-$C_2H_5$ | 5-$CH_3$ |
| 21 | 2-$CH(CH_3)_2$ | 3-$CH_3$ |
| 22 | 2-$CH(CH_3)_2$ | 4-$CH_3$ |
| 23 | 2-$CH_2CH_2CH_3$ | H |
| 24 | 3-$CH_2CH_2CH_3$ | H |
| 25 | 4-$CH_2CH_2CH_3$ | H |
| 26 | 2-$(CH_2)_3CH_3$ | H |
| 27 | 3-$(CH_2)_3CH_3$ | H |
| 28 | 4-$(CH_2)_3CH_3$ | H |
| 29 | 2-$CH(CH_3)CH_2CH_3$ | H |
| 30 | 4-$CH(CH_3)_2$ | 3-$CH_3$ |
| 31 | 2-$CH(CH_3)_2$ | 4-$CH_3$ |
| 32 | 4-$C(CH_3)_2CH_2CH_3$ | H |
| 33 | 2-$C_2H_5$ | 4-$C_2H_5$ |
| 34 | 4-$C(CH_3)_3$ | 2-$CH_3$ |
| 35 | 4-⟨H⟩ | H |
| 36 | 4-$(CH_2)_5CH_3$ | H |
| 37 | 4-$(CH_2)_7CH_3$ | H |
| 38 | $C_9H_{19}$ (techn. mixture) | H |

We claim:

1. Anthraquinone dyestuffs of the formula

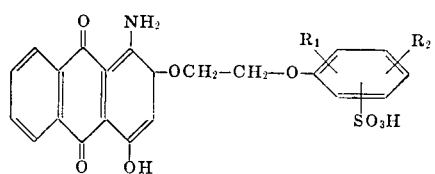

in which $R_1$ and $R_2$, independently of one another, stand for hydrogen, straight-chain or branched alkyl radicals with one to nine carbon atoms or chlorine atoms.

2. Anthraquinone dyestuff of the formula

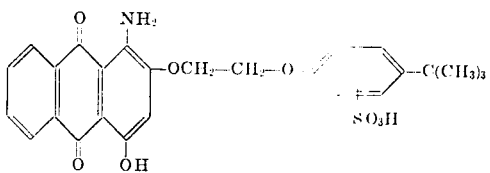

3. Anthraquinone dyestuff of the formula

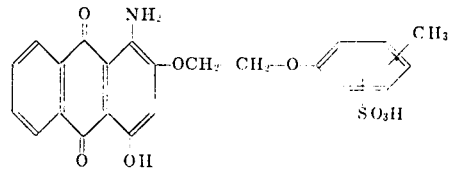

4. Anthraquinone dyestuff of the formula

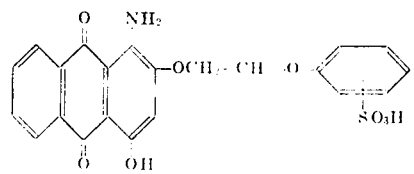

5. Anthraquinone dyestuff of the formula

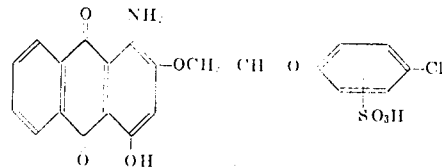

6. Anthraquinone dyestuff of the formula

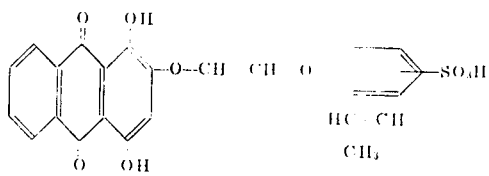

7. Anthraquinone dyestuff of the formula

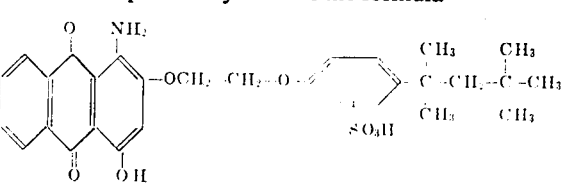

* * * * *

UNITED STATES PATENT OFFICE
CERTIFICATE OF CORRECTION

Patent No. 3,723,480                  Dated  March 27, 1973

Inventor(s) Gunter Gehrke, et al.

It is certified that error appears in the above-identified patent and that said Letters Patent are hereby corrected as shown below:

Cover Page, Item [75]
"Gehrke Gunter" should be ---Günter Gehrke---

Item [56]
"Libs" should be ---Lubs---

| Column | Line | Error |
|---|---|---|
| 1 | 54 | after "natural", the word "of" should be ---or--- |
| 4 | Claims 2-7 (inclusive) | which are not clearly readable due to poor ink density, should read: |

2.  Anthraquinone dyestuff of the formula

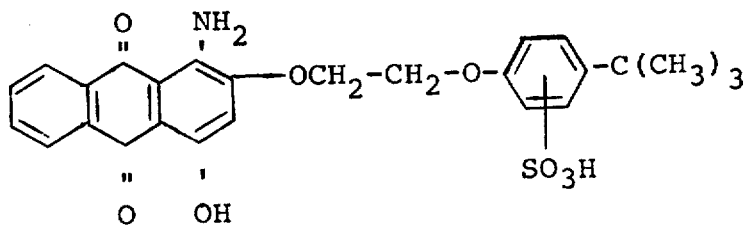

UNITED STATES PATENT OFFICE
CERTIFICATE OF CORRECTION

Patent No. 3,723,480          Dated    March 27, 1973

Inventor(s)    Gunter Gehrke, et al.

It is certified that error appears in the above-identified patent and that said Letters Patent are hereby corrected as shown below:

3.  Anthraquinone dyestuff of the formula

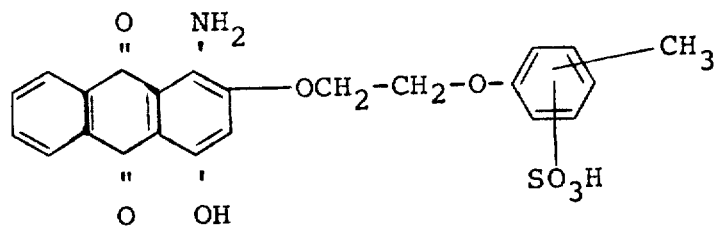

4.  Anthraquinone dyestuff of the formula

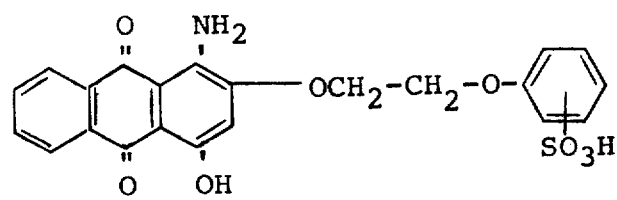

5.  Anthraquinone dyestuff of the formula

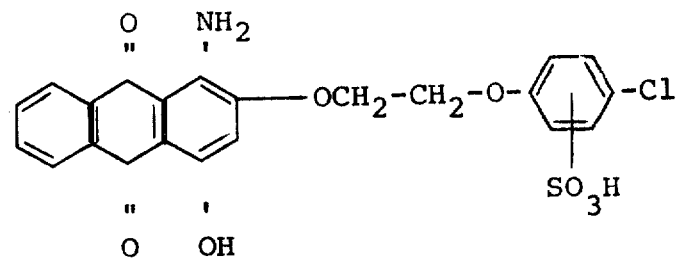

UNITED STATES PATENT OFFICE
CERTIFICATE OF CORRECTION

Patent No. 3,723,480      Dated March 27, 1973

Inventor(s) Gunter Gehrke, et al.

It is certified that error appears in the above-identified patent and that said Letters Patent are hereby corrected as shown below:

6.      Anthraquinone dyestuff of the formula

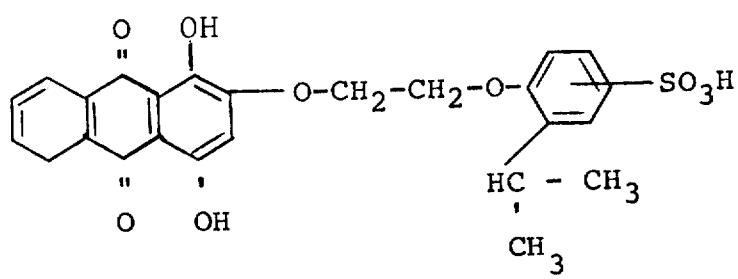

7.      Anthraquinone dyestuff of the formula

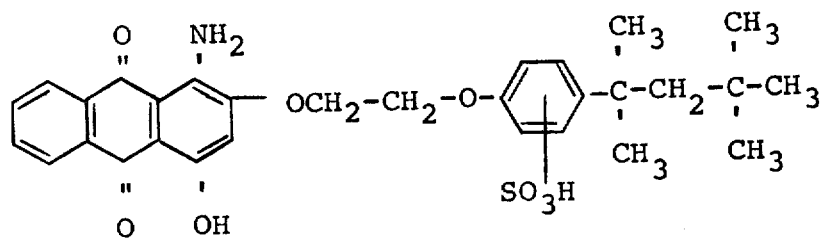

Signed and sealed this 12th day of February 1974.

(SEAL)
Attest:

EDWARD M. FLETCHER, JR.
Attesting Officer

C. MARSHALL DANN
Commissioner of Patents